(12) United States Patent
Othmer et al.

(10) Patent No.: US 8,467,503 B2
(45) Date of Patent: Jun. 18, 2013

(54) MESSAGING SYSTEMS AND METHODS

(75) Inventors: Konstantin Othmer, Mountain View, CA (US); Michael P. Ruf, Parkland, FL (US)

(73) Assignee: Smith Micro Software, Inc., Aliso Viejo, CA (US)

( * ) Notice: Subject to any disclaimer, the term of this patent is extended or adjusted under 35 U.S.C. 154(b) by 251 days.

(21) Appl. No.: 12/878,252

(22) Filed: Sep. 9, 2010

(65) Prior Publication Data

US 2010/0329434 A1 Dec. 30, 2010

Related U.S. Application Data

(63) Continuation of application No. 11/415,770, filed on May 2, 2006, now abandoned.

(51) Int. Cl.
*H04M 1/64* (2006.01)
(52) U.S. Cl.
USPC ........................................ 379/88.12; 379/67.1
(58) Field of Classification Search
USPC .................. 379/88.17, 88.18, 88.22, 202.01, 379/88.13, 88.12; 455/412.1, 413, 417, 455
See application file for complete search history.

(56) References Cited

U.S. PATENT DOCUMENTS

| | | | |
|---|---|---|---|
| 5,436,960 A | 7/1995 | Campana, Jr. et al. |
| 5,481,597 A | 1/1996 | Given |
| 5,621,727 A | 4/1997 | Vaudreuil |
| 5,625,670 A | 4/1997 | Campana, Jr. et al. |
| 5,684,862 A | 11/1997 | Finnigan |
| 5,819,172 A | 10/1998 | Campana, Jr. et al. |
| 5,963,618 A | 10/1999 | Porter |
| 6,014,427 A | 1/2000 | Hanson et al. |
| 6,067,451 A | 5/2000 | Campana, Jr. et al. |
| 6,175,859 B1 | 1/2001 | Mohler |
| 6,216,106 B1 | 4/2001 | John |
| 6,219,694 B1 | 4/2001 | Lazaridis et al. |
| 6,292,799 B1 | 9/2001 | Peek et al. |
| 6,317,592 B1 | 11/2001 | Campana, Jr. et al. |
| 6,333,973 B1 | 12/2001 | Smith et al. |
| 6,411,685 B1 | 6/2002 | O'Neal |
| 6,442,250 B1 | 8/2002 | Troen-Krasnow et al. |
| 6,526,127 B1 | 2/2003 | Piotrowski et al. |
| 6,539,077 B1 | 3/2003 | Ranalli et al. |
| 6,625,260 B1 | 9/2003 | Brockman et al. |

(Continued)

FOREIGN PATENT DOCUMENTS

| | | |
|---|---|---|
| EP | 1613045 | 1/2006 |
| WO | 2007-131060 | 11/2007 |

OTHER PUBLICATIONS

U.S. Appl. No. 11/415,770, filed May 2, 2006, Othmer.
U.S. Appl. No. 12/325,938, filed Dec. 1, 2008, Othmer et al.

(Continued)

*Primary Examiner* — Amal Zenati
(74) *Attorney, Agent, or Firm* — Workman Nydegger

(57) ABSTRACT

Managing voice messages across multiple voicemail systems. A server acts as a gateway and interacts with multiple voicemail systems and with multiple user devices. The server can retrieve voice messages from one voicemail system and transmit the retrieved voice messages to another separate voicemail system without user assistance. The voice messages are transcoded as necessary. The server also enables a recipient to generate a reply voice message that can be delivered to the original sender's device or delivered to the sender in another manner, such as a Vnote, SMS or an email.

14 Claims, 3 Drawing Sheets

U.S. PATENT DOCUMENTS

| | | | |
|---|---|---|---|
| 6,944,273 | B2 | 9/2005 | Huna |
| 6,987,840 | B1 | 1/2006 | Bosik et al. |
| 6,999,566 | B1 | 2/2006 | Eason et al. |
| 7,013,155 | B1 | 3/2006 | Ruf et al. |
| 7,027,567 | B1 | 4/2006 | Scott et al. |
| 7,225,230 | B1 | 5/2007 | Knoerle et al. |
| 7,251,480 | B1 | 7/2007 | Oh et al. |
| 7,738,637 | B2 * | 6/2010 | Schmandt et al. ......... 379/88.17 |
| 7,885,392 | B2 | 2/2011 | Fujita-Yuhas |
| 8,005,193 | B2 * | 8/2011 | Hollowell et al. ........... 379/88.13 |
| 2004/0042595 | A1 | 3/2004 | Davis et al. |
| 2004/0078443 | A1 * | 4/2004 | Malik ........................... 709/206 |
| 2005/0129191 | A1 * | 6/2005 | Kokko et al. ............... 379/88.13 |
| 2006/0018444 | A1 | 1/2006 | Pantana et al. |
| 2006/0025114 | A1 | 2/2006 | Bales et al. |
| 2006/0146989 | A1 | 7/2006 | Janssen |
| 2006/0177024 | A1 | 8/2006 | Frifeldt et al. |
| 2007/0274465 | A1 | 11/2007 | Othmer |
| 2007/0280439 | A1 * | 12/2007 | Prywes ...................... 379/88.18 |
| 2009/0180598 | A1 | 7/2009 | Othmer et al. |

OTHER PUBLICATIONS

International Search Report and Written Opinion, mailed Jun. 24, 2010, as issued in connection with corresponding Patent Application No. PCT/US2009/066256, filed on Dec. 1, 2009.

U.S. Appl. No. 13/547,268, filed Jul. 12, 2012, Othmer et al.

Extended European Search Report dated Jul. 8, 2012 for EP 09 83 0983.4-2414 / 2371151 PCT/US2009066256.

U.S. Appl. No. 11/415,770, Jun. 12, 2008, Office Action.

U.S. Appl. No. 11/415,770, Dec. 22, 2008, Final Office Action.

U.S. Appl. No. 11/415,770, Sep. 3, 2009, Office Action.

U.S. Appl. No. 11/415,770, Jun. 9, 2010, Restriction Requirement.

U.S. Appl. No. 12/325,938, Sep. 1, 2011, Office Action.

U.S. Appl. No. 12/325,938, Mar. 13, 2012, Office Action.

U.S. Appl. No. 12/325,938, Apr. 5, 2012, Notice of Allowance.

* cited by examiner

MESSAGING SYSTEMS AND METHODS

CROSS REFERENCE TO RELATED APPLICATIONS

This application is a continuation of U.S. application Ser. No. 11/415,770 filed May 2, 2006 and entitled PROVIDING UNIFIED ACCESS TO VOICE MESSAGES FROM DISPARATE SYSTEMS, which is incorporated by reference in its entirety.

BACKGROUND

1. Field of the Invention

The present invention relates to electronic messaging including voice messaging systems. More particularly, embodiments of the invention relate to systems and methods for synchronized message management across disparate voice message systems.

2. Related Technology

Communication is an important part of everyday life and many individuals use more than one electronic device to communicate with others. Home telephones, office telephones, cellular telephones, and computers are examples of devices used by individuals to communicate. These devices enable individuals to communicate using, for example, voicemail, email, and instant messages.

Advantageously, many of these devices provide features that enable users to communicate at the convenience of the sender and the recipient. A sender of an email, for example, can send an email that is delivered directly to the mail box of the recipient. Similarly, a recipient of an email has control over when he or she opens or replies to the email users can easily set up their email accounts to forward received emails to other accounts. In addition, replying to email is easy and works universally. The reply address is included in the email message, so the receiving email system can easily address a reply to the originator.

While email can typically be used and synchronized across disparate email systems, voicemail cannot be easily managed or synchronized in the same way. Voicemail enabled devices have much more difficulty in coordinating voice messages. For instance, a user that has both an office voicemail box and a personal wireless voicemail box is typically required to access each system independently in order to retrieve the various voicemails that the user has received.

Further, forwarding messages between voicemail systems is generally not supported. Users can forward messages when both the sender's voicemail box and recipient's voicemail box are within the same voicemail system. However, it is not possible for a sender to forward a message to another voicemail box unless the intended recipient is on the same voicemail system. For example, if a user receives a voicemail message that he would like to share with a friend who uses a different voicemail system, today it is not technically possible to send that message to the friend.

Sending a reply message in response to a received voicemail message presents a similar problem. Today's voicemail messages have only one address—the caller's phone number in the case caller ID is enabled. Since there is no standardized way to send a voice message to a phone number, there is no general mechanism in place that permits a user of a system to reply to a voice message with another message unless the originating caller is on the same voicemail system as the recipient. This forces the recipient to place a call to the original caller, which may not be what the recipient wants or needs to do, to answer a simple question, for example.

As these examples show, the problem with voicemail systems is the lack of interconnect between the systems, making them useful only to act in the capacity of taking a message as the result of a non-answered phone call. A second problem exists in that checking messages is a very slow, linear process, and can involve a user dialing into several voice systems to retrieve all the user's messages. A need in the art exists for systems and methods that enable users to manage their messages including voice messages across disparate systems, and reply to, forward, or delete those messages just as the user manages email.

SUMMARY

These and other limitations are overcome by embodiments of the invention, which relate to managing voice messages including instant voice messages (also referred to herein as Vnotes). In one embodiment, an instant voice message, or Vnote, is a voice message that can be sent to a recipient without calling or dialing the recipient. For example, a user can select a contact, record a voice message and then send the message to the recipient without dialing or placing a call to the recipient. The recipient can then retrieve or listen to the message at his or her leisure. Vnotes are described in U.S. Pat. No. 7,013,155, which is hereby incorporated by reference.

Embodiments of the invention synchronize message status across disparate voicemail systems. A messaging service pulls voice messages from participating voicemail systems and transmits the voice messages to the intended recipients. The messaging service then updates the status of the voice messages at all relevant voicemail systems based on the actions of the user at different devices and/or voicemail systems. Embodiments of the invention also enable users to reply to voice messages in multiple ways from disparate voicemail systems.

In one embodiment a server provides a gateway that interfaces with voicemail systems and with user devices. The server manages voice messages across disparate voicemail systems. In one example, the server accesses a voicemail system of a user and retrieves a voice message from the voicemail system. The server then transmits the voice message to another voicemail system of the user or to a user's device. The message is transcoded to the appropriate format when necessary. Next, the server updates the status of the transmitted message at each voicemail system. For example, actions performed by a user at a device with respect to the transmitted message are monitored by the server or reported to the server by the device. The server can then update the status of the voice message in the originating voicemail system.

Embodiments of the invention also enable a user to reply to a voice message that is retrieved from a voicemail system. In this example, the original voice message is transmitted to the recipient from a voicemail system. The server then determines that the recipient wants to send a reply message. After collecting information about the original voice message, which may include a telephone number, a server receives the reply voice message from the recipient and transmits the reply voice message based on information collected about the original voice message. For example, if the original voice message originated from a PBX system, then the reply voice message is returned through the PBX system. The options available for sending the reply voice message may be dependent on the receiving voicemail system. For example, a conventional PBX system may not accept email, MMS, or SMS messages. If, however, the original voice message is associated with a mobile device (rather than a PBX), then the reply can be sent via a voice message using a Vnote, or some form of text based messaging (e.g., SMS, MMS, email, or IM). If the mechanism for replying via a phone number is unknown for the source address, the system allows the user to reply using the email address stored in the phone's contact list or in a server-side system directory for that user instead.

These and other aspects of embodiments of the present invention will become more fully apparent from the following description and appended claims.

BRIEF DESCRIPTION OF THE DRAWINGS

In order that the manner in which the above-recited and other advantages and features of the invention are obtained, a more particular description of the invention briefly described above will be rendered by reference to specific embodiments thereof which are illustrated in the appended drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION OF EMBODIMENTS OF THE INVENTION

Embodiments of the invention relate to systems and methods for providing unified access to voice messages and more particularly to a messaging system for managing voice messages across multiple voice messaging systems. Managing voice messages across disparate or unrelated voice message systems enables users to interact (retrieve, play, replay, save, forward, delete, reply, etc.) with a voice message from any device or system. The messaging service synchronizes the altered status of voice messages across all or some of the user's other voicemail systems. Embodiments of the invention also enable a user to reply to voice messages in multiple ways, for example by voice, email, or instant messaging.

The messaging service includes a voice messaging server that interacts with disparate voice message systems to provide a unified method for managing voice messages. Through the messaging servers, users are able to synchronize voice messages, receive voice messages, reply to voice messages in various ways, and the like across disparate voice message systems. A user may also send a reply to a voice message using a Vnote, an email, or other form of communication.

Embodiments of the invention may include the use of Vnotes. In a conventional system, a caller is required to place a call to a recipient and the caller is directed to the recipient's voicemail box only when the recipient does not answer. The caller can then record a voice message that is stored in the recipient's voicemail box. A Vnote, in contrast, can be generated and sent to the recipient without placing a call to the recipient. Further, a Vnote may be stored on a server rather than in the recipient voicemail box.

Figure 1:
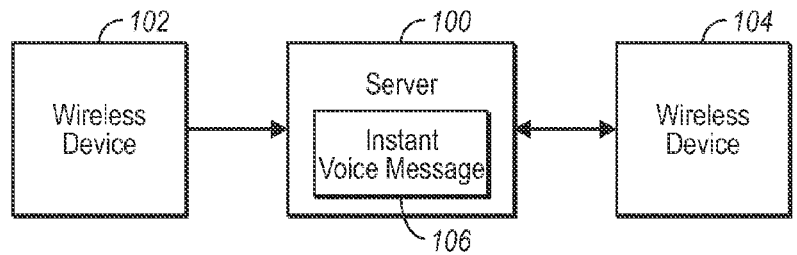
FIG. 1 is a block diagram illustrating a server that delivers Vnotes from a sender device to a recipient device.

FIG. 1 illustrates one embodiment of a Vnote and the delivery of the Vnote. A caller can operate the wireless device 102 to generate a Vnote 106. This may include identifying a recipient of the Vnote from a contact list, for example, or speaking the name of the recipient in some instances. The caller can then simply speak the Vnote, which is directly transmitted to the server 100 by the device 102 or recorded by the device 102 and sent to the server 100 at a later time. In either case, the Vnote 106 is transmitted to the server 100, which stores the Vnote 106.

The server 100 then considers the recipient wireless device 104. If the wireless device 104 is enabled for Vnotes, the Vnote 106 can be transmitted directly to the device 104, without calling the device 104. The recipient may be visually notified, for example, that a Vnote has been received by the device 104. If the device 104 is not enabled to receive Vnotes, then a text message (such as an SMS message) may be generated by the server 100 and sent to the device 104. The text message may include a telephone number that the recipient can call in order to listen to the Vnote 106. In this manner, a device 102 can communicate using Vnotes. The device 102 can also call the recipient and leave a voice message in the recipient's voicemail box.

Figure 2:
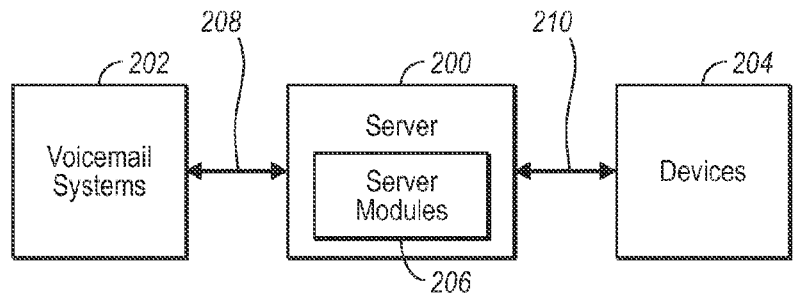
FIG. 2 illustrates one embodiment of a server than manages voice messages across disparate voicemail systems for multiple devices.

FIG. 2 is a block diagram illustrating exemplary systems and methods for managing messages, including Vnotes, across disparate voicemail systems. The server 200, which is one embodiment of the server 100 in FIG. 1, functions as a gateway between voicemail systems 202 and devices 204. The communication 208 between the voicemail systems 202 and server 200 and the communication 210 between the devices 204 and the server 200 can be wired and/or wireless communication. In addition, the communication 208 and 210 can be IP based, RF based, or may rely on other protocols such as VPIM, IMAP, or other proprietary protocol.

The voicemail systems 202 represent various types of voicemail systems. As a result, the management of voice messages may include a communication from one voicemail system to another voicemail system through the server 200. In this example, the server 200 interacts with all of the voicemail systems 202 and with the devices 204 to manage messages including Vnotes. Advantageously, embodiments of the invention enable voice messages generated in a particular PBX system to be delivered to a user of another, separate, PBX system.

Setting status of voice messages can be performed at different times by the server 200. The server 200 can track the various voice messages that are transmitted from one voicemail system to another. The server 200 also monitors the various devices and voicemail systems related to the voice messages. This enables the server 200 to set or change status at one voicemail system for an action that occurred on a separate device or in a separate voicemail system.

Optionally, a user typically has the ability to set preferences that may impact whether or not the status of a voice message is changed. For example, a user that receives a voice message on a mobile device that was originally delivered to a PBX voicemail box may desire to delete the voice message from the mobile device without deleting the voice message from the PBX system. In this example, system preferences define whether the voice message is then moved to a "deleted" state when the user deletes the message on the second voicemail system.

The server 200 accesses the voicemail systems 202 and sets status (read, forwarded, deleted, etc.) for the user's voicemail messages. The server 200 identifies status of the voice messages on a given voicemail system and ensures that the voice message has the same status on other voicemail systems and in accordance with system and/or user preferences on those voicemail systems.

Further, the server 200 enables the user of a device 204 to set or change the status of a voice message in a voicemail system 202 without requiring the user to access the corresponding voicemail system. For example, the server 200 may access a first voicemail system and discover that a new voice message is present. As the voice message is retrieved and delivered to another of the user's voicemail systems or devices, the server 200 can also set the status of the voice message in the first voicemail system. Alternatively, the server 200 may wait until the voice message is accessed in the second voicemail system in order to determine what the user does with the voice message. Any change in status at the second voice mail system is then reflected to the first voicemail system by the server 200.

Thus, the status is applied, in one embodiment, to the voice message as it is transferred from one voicemail system to another voicemail system or as a voice message is delivered to a user's device. For example, the status of a voice message may be automatically set to "read" and/or "forwarded" when the server 200 retrieves the voice message for delivery to a second voicemail system, to the user's mobile device, and the like. Alternatively, the server 200 can monitor the actions performed by a user with respect to a given message in the context of the second voicemail system and then go back to the first voicemail system to synchronize the appropriate status to the voice message.

The server 200 can ensure that any status change to a voice message that results from any action performed by a user at the second mailbox can be applied to that same voice message in the first voicemail system. For example, a message may be received in a user's PBX voicemail box, then automatically forwarded to the user's wireless voicemail box. The user may then use his cellular device to listen to and delete this voice message. The user's action of deleting a voice message from the cellular voicemail system is either monitored by the server 200 or is reported to the server 200 by the cellular device. When the server 200 becomes aware of the change in status to the deleted voice message, the server can access the PBX voicemail box and cause the deletion of the voice message from the user's PBX voicemail box. In this manner, the server 200 manages and synchronizes voice messages in disparate voicemail systems. Other changes in status can be similarly synchronized. Because the server 200 interfaces with all of the user's voicemail systems and devices, the server 200 can also continue to synchronize status when additional voicemail systems become involved or when a user replies to a voice message.

The server 200 has server modules 206 that, in addition to providing message synchronization as discussed above, provide the ability to reply to a voice message, regardless of where the original voice message was received. In other words, if a message is originally sent to and received at voicemail system A, then a copy of the message is forwarded to voicemail system B, the recipient of the forwarded message can send a reply message to the sender from within voicemail system B. Because voice messages stored in different voicemail systems are often stored in different formats, the server modules 206 performs any transcoding that may be necessary to enable a target device to listen to and/or reply to a voice message.

The server modules 206 also provide mapping functionality, although some mapping may be implemented at the various devices 204. For example, a user that receives a voice message associated with a landline telephone number cannot typically send a reply voice message to a landline telephone (a call may be required). However, the user's device may include contact information indicating that a reply can be sent to a mobile device associated with the landline telephone number. Thus, the reply voice message can be sent to the caller's mobile device. The reply voice message can also be sent to the caller's email address as an attachment, for example. In some embodiments, both the original voice message and the reply voice message are Vnotes that do not require a user to place a call to the intended recipient.

Figure 3:
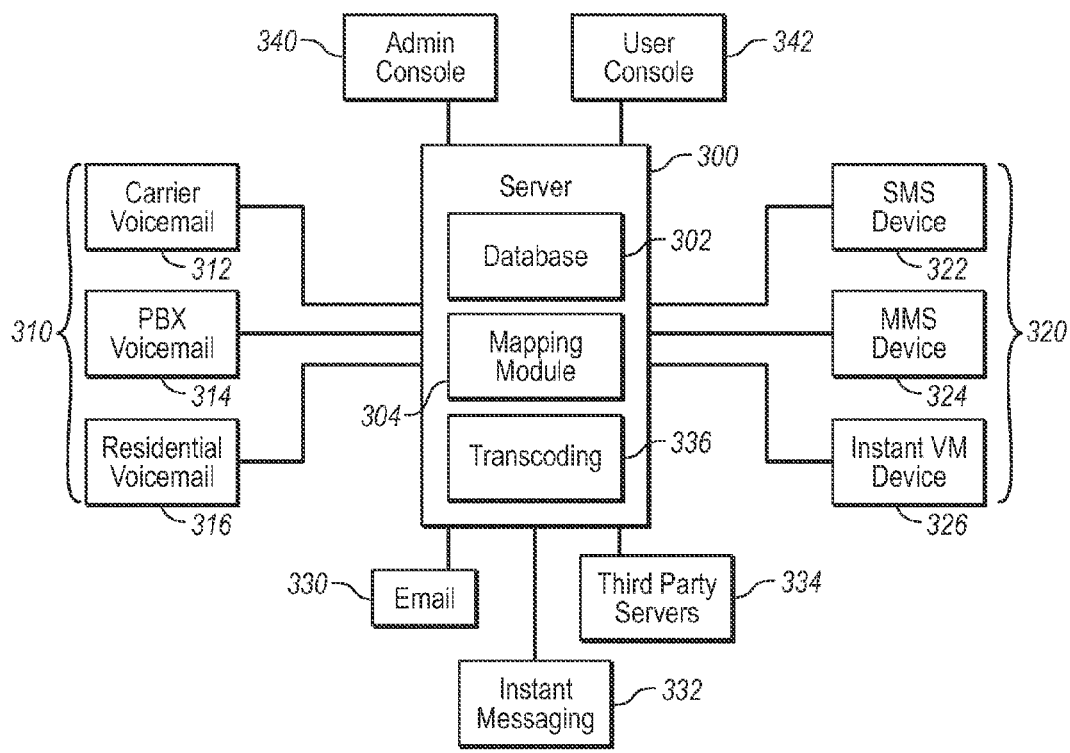
FIG. 3 is a block diagram illustrating one embodiment of a server that manages multiple voice message formats across multiple voicemail systems and illustrating systems and methods for replying to voice messages including voicemail, Vnotes or other method including email.

FIG. 3 is a block diagram further illustrating the management of voice messages including Vnotes. The server 300, which is an embodiment of the server 100 shown in FIG. 1, interacts with the devices 320 and the voicemail systems 310. The admin console 340 enables an administrator to access the server 300 and perform administrative actions. Administrative actions include server management, setting default actions, administering gateways to the voicemail systems 310, and the like.

Through the user console 342, users can access the server 300 and set, for example, user preferences. User preferences may include defining rules that determine how the server 300 operates on voice messages or changes the status of the user's voice messages at each of the voicemail systems 310. The rules may include, by way of example, setting a preferred voice message format or preferred target device, setting email addressing, providing mapping information used in addressing reply voice messages, specifying specific status settings in certain instances such as delete, and the like. In some instances, the rules or other settings can be stored on a user's device and/or the server 300.

A user may also define rules identifying what actions should occur as the server 300 manages messages. For example, a message received at the user's PBX voicemail system should be routed to the user's email address and marked as read in the user's PBX system by the server 300. Voice messages from key customers, on the other hand, should be sent as Vnotes to the user's mobile device.

In this example, the voicemail systems 310 include a carrier voicemail 312, a PBX voicemail 314, and a residential voicemail 316. The carrier voicemail 312 is usually associated with a user's mobile device and the PBX voicemail 314 is the user's work voicemail system. The residential voicemail 316 may be at the user's residence. The devices 320 represent devices with various capabilities. The SMS device 322 is enabled for at least SMS communications. The MMS device 324 is enabled for at least MMS communications. The Vnote device 326 is enabled to receive at least Vnotes, which may include other media content. Each of the devices 320 may also be enabled to receive different types of messages. For example, the device 324 may be able to receive both SMS and MMS messages. Other devices may include a PBX telephone and the like. The device 320 may also include other devices such as, but not limited to, personal digital assistants, laptop computers, and the like.

In one embodiment, the server 300 manages voice messages by periodically polling the voicemail systems 310, although the voicemail systems 310 themselves may initiate the connection with the server 300 (such as when a new voice message is received). The ability of the server 300 to access these systems may be enabled when a user accesses the server through the user console 342 and provides the server 300 with the necessary credentials. As a result, the server 300 has access to a user's various voicemail boxes in disparate voicemail systems. When a status change is detected to any voicemail in any particular voicemail system, that status change can replicated in the other voicemail systems in which the user has an account. As previously indicated, the status can be actively monitored by the server 300 or the various voicemail systems and devices and also initiate notice of the status change to the server 300.

For example, a user may receive a voicemail at the PBX voicemail 314. The server 300, after polling the PBX voicemail 314 or after receiving a notice from the PBX voicemail 314 discovers the new voicemail. The server 300 causes the new voicemail to be delivered to the user's carrier voicemail 312. The server 300 can also deliver the new voicemail to the user's voicemail box or deliver the voicemail as a Vnote to the user's device or send the voice message in an email 330 or in an instant message 332. If necessary, the server 300 performs transcoding 336 on the voice message before delivery to the user's device.

If the user listens to the new voicemail or to the Vnote and then deletes the voicemail or the Vnote at the user's device, the server 300 ensures that the voicemail is also deleted from the PBX voicemail 314 if defined in the rules established by the user. In this manner, the server 300 can synchronize messages across the voicemail systems 310.

Embodiments of the invention also enable a recipient of a voice message to send a reply. Sending a reply to a voice message is inherently more difficult than sending a reply to an email, which usually has a built in reply address. Although the original number of the caller may be associated with the voice message, that number does not necessarily correspond to a voicemail box. A call from a PBX system that results in a voice message being stored in another voicemail box outside the PBX system, for example, often has a general number associated with the voice message. A reply voice message to the general number of the PBX system does not cause the reply voice message to reach the caller's voicemail box. Further a number does not provide any information relating to the capabilities of the calling device. As a result, the ability to reply to a voice message is more difficult to manage.

Figure 4:
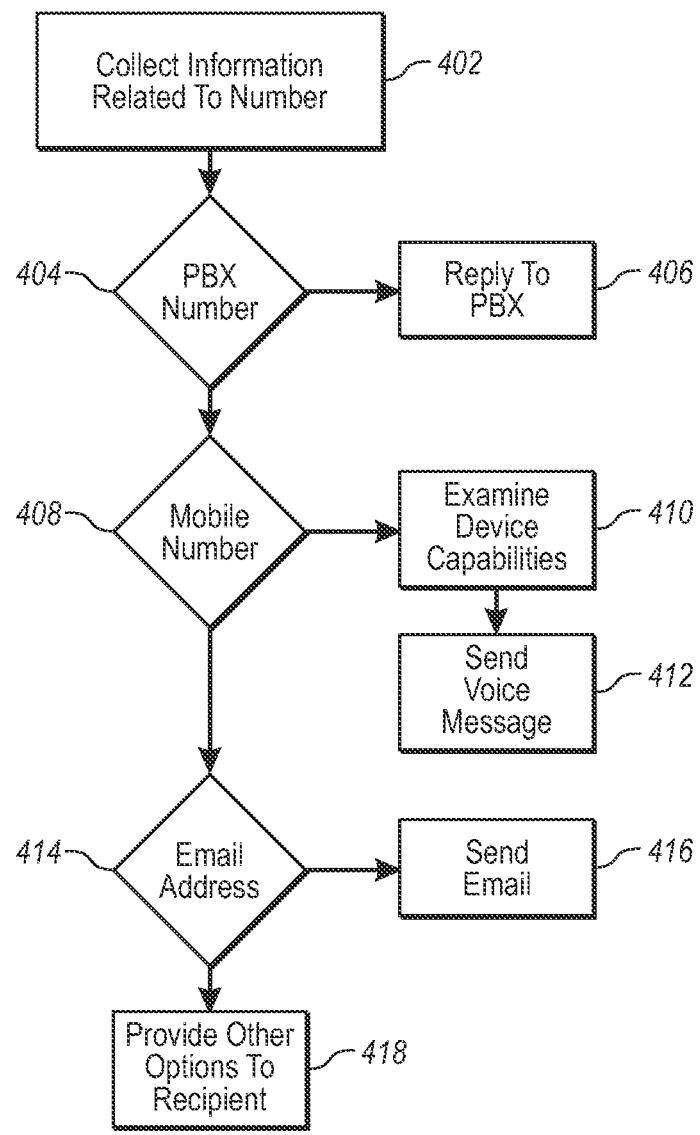
FIG. 4 illustrates one embodiment of a method for replying to a voice message from a sender device.

FIG. 4 illustrates an exemplary method for replying to voice messages including Vnotes. As previously described, a server 300 may send a Vnote, retrieved from a user's PBX voicemail system, to the user's mobile device. The Vnote often has a calling number associated with it, which may be stored at the server 300 or included in the Vnote.

If the recipient of the Vnote decides to send a reply Vnote, then either or both the recipient's device or the server become involved in the generation of the reply voice message. This example begins by collecting 402 information relating to the calling number associated with the received voice message. This may be done by the server 300 as it retrieves a voice message from the originating voicemail box. If the calling number is a PBX number 404, then a reply voice message 406 can be generated and sent to the callers PBX voicemail box. When the server 300 retrieves a voice message from a user's PBX voicemail box, the direct line is usually known to the server 300, which enables the server 300 to facilitate a reply to the PBX voicemail box.

For example, if the caller and the recipient are in the same PBX system, then the voice message received by the recipient's PBX voicemail box has the information needed to generate a reply to the caller's PBX voicemail box. The server 300 can detect that the recipient has a new voice message in the recipient's PBX voicemail box, and then deliver that message to the recipient's mobile device as a Vnote. The recipient can then generate a reply Vnote that is directed by the server 300 to the caller's PBX voicemail box via the recipient's PBX voicemail box. The server 300 typically performs any transcoding of the message that may be required to send a voice message stored in a PBX voicemail box as a Vnote to the recipient's mobile device, as well as transcoding the reply from the format of the mobile device to one acceptable to the PBX.

If the caller number is not a PBX number, but is determined to be a mobile device number 408, then the server can examine 410 the capabilities of the calling mobile device and send 412 a voice message based on those capabilities. For example, if the calling device is enabled for Vnotes, then a reply Vnote is sent to the calling device. If the calling device is not enabled for Vnotes, then an SMS or MMS message may be sent to the device. The SMS or MMS message may include instructions describing how the calling device can access the reply voice message, which may be stored by the server or on an IVR system associated with the server.

If the caller number is not a PBX number or a mobile number, the server or recipient device may determine if an email address 414 is available for the calling number. If an email address is available, the recipient has the option to send a text message to the email address, or to send a Vnote using email, that is, an email is sent 416 with the reply Vnote as an attachment. Likewise, if a PBX number or a mobile number is available for the caller, the reply can be sent back to either of those systems. If none of these systems are available for the caller, the recipient may be provided 418 with other options. The recipient may have the opportunity to call the caller directly if the calling number is, for example, a landline device.

Although FIG. 3 illustrates a particular order for determining how to send a reply to a voice message, one of skill in the art can appreciate that the order can be performed in another order. The order may be determined, in one embodiment, by default or by user preferences.

With reference to FIG. 3, the server also provides additional features to manage voice messages. The mapping module 304, for example, can be used to map PBX numbers in a database. As the database grows, the server 300 gains the ability to manage voice messages across disparate PBX systems. As a result, a user in one PBX system can generate a voice message including a Vnote that is delivered directly to the voicemail box of a user in a separate PBX system. The server can begin to build a database of numbers that are associated with specific PBX systems.

The transcoding module 336 enables the server 300 to accommodate the various features and capabilities of disparate voicemail systems 310 and devices 320. Providing a transcoding module 336 relieves the voicemail systems of the responsibility of ensuring message compatibility. The server 300 takes the responsibility of ensuring that a particular message is compatible with the receiving voicemail system or device in this example. The voicemail systems, however, are not precluded from generating voice messages in the appropriate format.

Further, the server can use email 330, instant messaging 332, and other third party services 334 to manage voice messages across multiple voicemail systems. For example, the mapping module 304 may indicate that voice messages from a given number or from a given PBX system, can be replied to using email. Thus, the mapping module 304 provides voice message routing capabilities.

In one embodiment, the address mapping capabilities can be performed at a device. The contact information for a given caller for example, may specify that reply voice messages are to be delivered as reply Vnotes to a specific mobile device, or are to be delivered in another specified manner.

Figure 5:
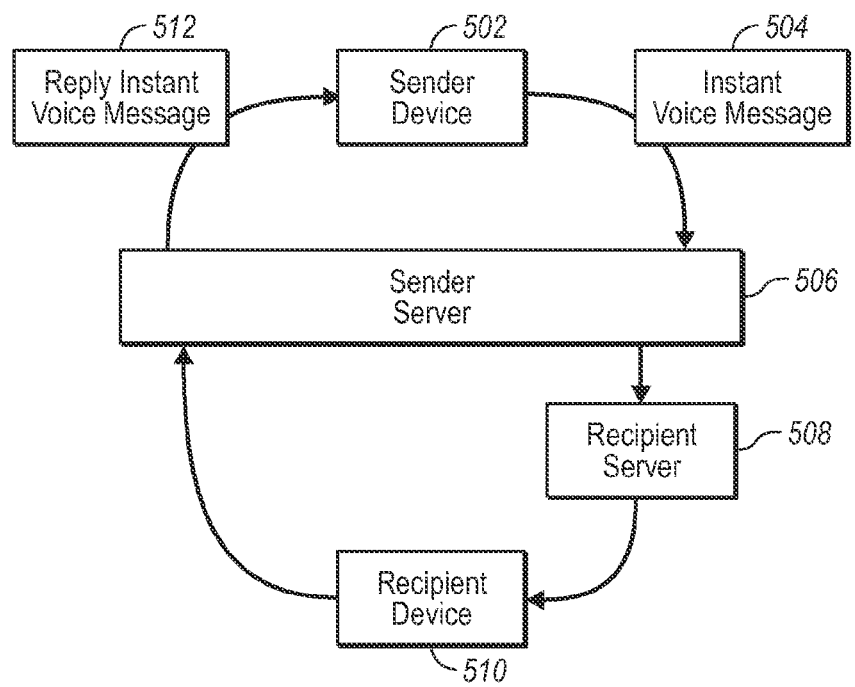
FIG. 5 depicts an exemplary method for sending and receiving a Vnote.

FIG. 5 illustrates an example of voice message management including the ability to reply to a Vnote. In this example, the sender device 502 creates a Vnote 504 that is delivered to the sender's server 506. The server 506 determines or already is aware that the recipient device 510 is not enabled to receive Vnotes. In this example, the server 506 thus transcodes the Vnote into a voicemail format and then sends the transcoded voice message to the recipient's server 508, which routes the voice message to the recipients voicemail. Alternatively, the sender's server 506 may store the message at an IVR server and send an SMS message to the recipient device 510 as previously described.

The recipient device 510 thus receives a voicemail. In one example, the sender's server 506 adds a tag to the voicemail that facilitates a reply. In this case, the recipient sends a voicemail reply message that is received by the sender's server 506. The server 506 transcodes the reply voice message into a reply Vnote 512 and delivers it to the sender device 502.

Figure 6:
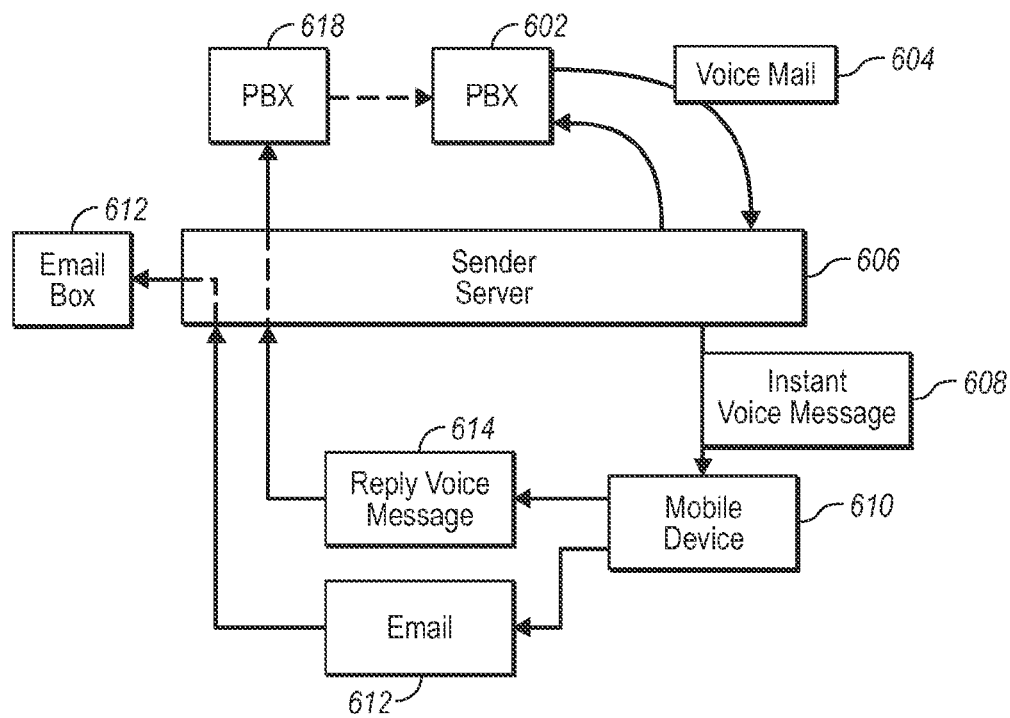
FIG. 6 illustrates one embodiment of a method for receiving a voice message from one PBX system and replying to the voice message at another separate PBX system.

FIG. 6 illstrates another embodiment of message management. In this example, the server 606 detects a voicemail message 604 in a user's PBX voicemail box 602. The server 606 retrieves the voicemail and then transcodes the voicemail into a Vnote 608, which is delivered to the mobile device 610 of the user.

At the mobile device 610, the user decides to reply to the Vnote. During message synchronization, the server 606 determines the action performed by the user at the device 610 and then updates the status of the voicemail message 604 at the PBX voicemail box 602.

The type of reply generated at the mobile device 610 can take different forms as previously described. In some instances, the preferred reply type is selected automatically by the server 606 or by the device 610 itself. In the case where the reply is via email 612, the server 606 may transcode the reply voice message into the appropriate format for email and then send the reply voice message in an email to the recipient's email box 620.

On the other hand, the user may reply using a reply Vnote 614. In this example, the original voicemail message 604 was received from a caller associated with the PBX voicemail box 618 (which may be in an independent PBX system). The server 606 receives the reply Vnote, transcodes the reply Vnote to voicemail format, and then delivers the voicemail to the PBX voicemail box 618. In the case where the PBX voicemail box 618 and 602 are in the same PBX system, the delivery of the reply voicemail to the PBX voicemail box 618 can be achieved through the PBX voicemail box 602. In the case where the PBX voicemail box 618 of the caller is in a different PBX system, the delivery of the reply voicemail or Vnote may be achieved using the mapping module that tracks numbers associated with PBX systems. Alternatively, the mapping module may direct the reply voicemail to another device of the caller such as the caller's mobile voicemail system or to the caller's email.

The embodiments of the present invention may comprise a special purpose or general-purpose computer including various computer hardware, as discussed in greater detail below. Embodiments within the scope of the present invention also include computer-readable media for carrying or having computer-executable instructions or data structures stored thereon. Such computer-readable media can be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium which can be used to carry or store desired program code means in the form of computer-executable instructions or data structures and which can be accessed by a general purpose or special purpose computer. When information is transferred or provided over a network or another communications connection (either hardwired, wireless, or a combination of hardwired or wireless) to a computer, the computer properly views the connection as a computer-readable medium. Thus, any such connection is properly termed a computer-readable medium. Combinations of the above should also be included within the scope of computer-readable media. Computer-executable instructions comprise, for example, instructions and data which cause a general purpose computer, special purpose computer, or special purpose processing device to perform a certain function or group of functions.

The following discussion is intended to provide a brief, general description of a suitable computing environment in which the invention may be implemented. Although not required, the invention will be described in the general context of computer-executable instructions, such as program modules, being executed by computers in network environments. Generally, program modules include routines, programs, objects, components, data structures, etc. that perform particular tasks or implement particular abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Those skilled in the art will appreciate that the invention may be practiced in network computing environments with many types of computer system configurations, including personal computers, hand-held devices, multi-processor systems, microprocessor-based or programmable consumer electronics, network PCs, minicomputers, mainframe computers, and the like. The invention may also be practiced in distributed computing environments where tasks are performed by local and remote processing devices that are linked (either by hardwired links, wireless links, or by a combination of hardwired or wireless links) through a communications network. In a distributed computing environment, program modules may be located in both local and remote memory storage devices.

The described embodiments are to be considered in all respects only as exemplary and not restrictive. The scope of the invention is, therefore, indicated by the appended claims rather than by the foregoing description. All changes which come within the meaning and range of equivalency of the claims are to be embraced within their scope.

What is claimed is:

1. In a handheld wireless telecommunication device configured to send and receive voice messages, the handheld wireless telecommunication device including a storage device, contact information for a set of contacts being locally stored on the storage device of the handheld wireless telecommunication device, a method comprising:

by the handheld wireless telecommunication device, receiving a first voice message from a sender, the first voice message including a first address of the sender, the first address comprising a first telephone number of the sender;

by the handheld wireless telecommunication device, creating a reply message to the received voice message;

by the handheld wireless telecommunication device, automatically obtaining, from the received voice message, the first telephone number of the sender;

by the handheld wireless telecommunication device, automatically using the first telephone number obtained from the received voice message to identify a portion of the locally stored contact information for the sender, the identified portion of the locally stored contact information for the sender including:

the first telephone number; and a second address of the sender; and by the handheld wireless telecommunication device, automatically addressing the reply message using the second address of the sender, instead of the first address of the sender.

2. In a handheld wireless telecommunication device configured to send and receive voice messages, the handheld wireless telecommunication device including a storage device, contact information for a set of contacts being locally stored on the storage device of the handheld wireless telecommunication device, a method comprising:

by the handheld wireless telecommunication device, receiving a first voice message from a sender, the first voice message including a first address of the sender, the first address comprising a first telephone number of the sender;

by the handheld wireless telecommunication device, creating a voice message in reply to the received voice message;

by the handheld wireless telecommunication device, automatically obtaining, from the received voice message, the first telephone number of the sender;

by the handheld wireless telecommunication device, automatically determining that the reply voice message should be sent to an address other than the first telephone number obtained from the received voice message;

by the handheld wireless telecommunication device, in response to determining that the reply voice message should be sent to an address other than the first telephone number obtained from the received voice message:

automatically using the first telephone number obtained from the received voice message to identify a portion of the locally stored contact information for the sender, the identified portion of the locally stored contact information for the sender including:

the first telephone number; and a second address of the sender; and automatically addressing the reply message using the second address of the sender, instead of the first address of the sender.

3. The method of claim 1 or claim 2, wherein the second address of the sender comprises an email address of the sender; and wherein automatically addressing the reply message using the second address of the sender, instead of the first address of the sender comprises:

automatically addressing the reply message using the email address of the sender, instead of the first telephone number.

4. The method of claim 1 or claim 2, wherein the first telephone number is a landline telephone number of the sender;

wherein the second address of the sender comprises a mobile telephone number of the sender; and wherein automatically addressing the reply message using the second address of the sender, instead of the first address of the sender comprises:

automatically addressing the reply message using the mobile telephone number of the sender, instead of the landline telephone number.

5. The method of claim 1 or claim 2, wherein the first telephone number is a landline telephone number of the sender;

wherein the second address of the sender comprises an IM address of the sender; and wherein automatically addressing the reply message using the second address of the sender, instead of the first address of the sender comprises:

automatically addressing the reply message using the IM address of the sender, instead of the landline telephone number.

6. The method of claim 1 or claim 2, wherein the first telephone number is a landline telephone number of the sender;

wherein the second address of the sender comprises an MMS address of the sender; and wherein automatically addressing the reply message using the second address of the sender, instead of the first address of the sender comprises:

automatically addressing the reply message using the MMS address of the sender, instead of the landline telephone number.

7. The method of claim 1 or claim 2, further comprising:

sending the automatically-addressed reply message to the second address of the sender, instead of the first address of the sender.

8. A system comprising:

a handheld wireless telecommunication device configured to send and receive voice messages, the handheld wireless telecommunication device including a storage device and contact information for a set of contacts locally stored on the storage device, the handheld wireless telecommunication device being further configured to:

receive a first voice message from a sender, the first voice message including a first address of the sender, the first address comprising a first telephone number of the sender;

create a reply message to the received voice message;

automatically obtain, from the received voice message, the first telephone number of the sender;

automatically use the first telephone number obtained from the received voice message to identify a portion of the locally stored contact information for the sender, the identified portion of the locally stored contact information for the sender including:

the first telephone number; and a second address of the sender; and automatically address the reply message using the second address of the sender, instead of the first address of the sender.

9. A system comprising:

a handheld wireless telecommunication device configured to send and receive voice messages, the handheld wireless telecommunication device including a storage device and contact information for a set of contacts locally stored on the storage device, the handheld wireless telecommunication device being further configured to:

receive a first voice message from a sender, the first voice message including a first address of the sender, the first address comprising a first telephone number of the sender;

create a reply message to the received voice message;

automatically obtain, from the received voice message, the first telephone number of the sender;

automatically determine that the reply voice message should be sent to an address other than the first telephone number obtained from the received voice message; and in response to determining that the reply voice message should be sent to an address other than the first telephone number obtained from the received voice message:

automatically use the first telephone number obtained from the received voice message to identify a portion of the locally stored contact information for the sender, the identified portion of the locally stored contact information for the sender including:

the first telephone number; and a second address of the sender; and automatically address the reply message using the second address of the sender, instead of the first address of the sender.

10. The system of claim 8 or claim 9, wherein the second address of the sender comprises an email address of the sender; and wherein the handheld wireless telecommunication device is configured to automatically address the reply message using the second address of the sender, instead of the first address of the sender by:

automatically addressing the reply message using the email address of the sender, instead of the first telephone number.

11. The system of claim 8 or claim 9, wherein the first telephone number is a landline telephone number of the sender;

wherein the second address of the sender comprises a mobile telephone number of the sender; and wherein the handheld wireless telecommunication device is configured to automatically address the reply message using the second address of the sender, instead of the first address of the sender by:

automatically addressing the reply message using the mobile telephone number of the sender, instead of the landline telephone number.

12. The system of claim 8 or claim 9, wherein the first telephone number is a landline telephone number of the sender;

wherein the second address of the sender comprises an IM address of the sender; and wherein the handheld wireless telecommunication device is configured to automatically address the reply message using the second address of the sender, instead of the first address of the sender by:

automatically addressing the reply message using the IM address of the sender, instead of the landline telephone number.

13. The system of claim 8 or claim 9, wherein the first telephone number is a landline telephone number of the sender;

wherein the second address of the sender comprises an MMS address of the sender; and wherein the handheld wireless telecommunication device is configured to automatically address the reply message using the second address of the sender, instead of the first address of the sender by:

automatically addressing the reply message using the MMS address of the sender, instead of the landline telephone number.

14. The system of claim 8 or claim 9, wherein the handheld wireless telecommunication device is further configured to:

send the automatically-addressed reply message to the second address of the sender, instead of the first address of the sender.

* * * * *